United States Patent
Cuenoud (10) Patent No.: US 12,544,351 B2
(45) Date of Patent: Feb. 10, 2026

(54) METHODS USING MEDIUM CHAIN TRIGLYCERIDES ADMINISTERED PRIOR TO A MEAL TO DECREASE POSTPRANDIAL GLUCOSE FROM THE MEAL

(71) Applicant: SOCIETE DES PRODUITS NESTLE S.A., Vevey (CH)

(72) Inventor: Bernard Cuenoud, Cully (CH)

(73) Assignee: Societe des Produits Nestle S.A., Vevey (CH)

( * ) Notice: Subject to any disclaimer, the term of this patent is extended or adjusted under 35 U.S.C. 154(b) by 884 days.

(21) Appl. No.: 17/440,246

(22) PCT Filed: Mar. 20, 2020

(86) PCT No.: PCT/EP2020/057716
§ 371 (c)(1),
(2) Date: Sep. 17, 2021

(87) PCT Pub. No.: WO2020/193385
PCT Pub. Date: Oct. 1, 2020

(65) Prior Publication Data
US 2022/0168257 A1 Jun. 2, 2022

Related U.S. Application Data (60) Provisional application No. 62/822,271, filed on Mar. 22, 2019.

(51) Int. Cl.
*A61K 31/23* (2006.01)
*A61K 9/00* (2006.01)
*A61P 3/10* (2006.01)

(52) U.S. Cl.
CPC ............ *A61K 31/23* (2013.01); *A61K 9/0053* (2013.01); *A61P 3/10* (2018.01)

(58) Field of Classification Search
CPC .......... A61P 3/10; A61K 9/0053; A61K 31/23
See application file for complete search history.

(56) References Cited

U.S. PATENT DOCUMENTS

2004/0076719 A1  4/2004  Pimentel

FOREIGN PATENT DOCUMENTS

| EP | 0691079 | A2 | 1/1996 |
| EP | 1269859 | A2 | 1/2003 |
| EP | 1421858 | A1 | 5/2004 |
| JP | 2016514725 | A | 5/2016 |
| WO | 2009118968 | | 10/2009 |
| WO | 2011118810 | A1 | 9/2011 |

OTHER PUBLICATIONS

Nathan, David M., "Diabetes: Advances in Diagnosis and Treatment", 2015, JAMA, 314, pp. 1052-1062 (Year: 2015).*
Buse et al., "How do we define cure of diabetes?", 2009, Diabetes Care, 32, pp. 2133-2135 (Year: 2009).*
St-Onge et al., "Impact of medium and long chain triglycerides consumption on appetite and food intake in overweight men" European Journal of Clinical Nutrition, 2014, vol. 68, pp. 1134-1140 (Year: 2014).*
"NEOBEE(R) 1053", 2024, Stepan Company, 2 pgs. (Year: 2024).*
Tricò et al., "Sustained effects of a protein and lipid preload on glucose tolerance in type 2 diabetes patients", 2016, Diabetes & Metabolism, 42, pp. 242-248 (Year: 2016).*
Hunter et al., "Parmesan Cheese Nutrients", 2024, Nutrivore, 17 pgs. (Year: 2024).*
"Bulletproof(R) Coffee Making Kit", 2013, OptimOZ, 4 pgs. (Year: 2013).*
Kruk et al., "Water mobility in cheese by means of Nuclear Magnetic Resonance relaxometry", 2021, Journal of Food Engineering, 298, pp. 1-7 (Year: 2021).*
Nutritionix, "Butter, salted—1 stick", 2016, Syndigo, 3 pgs. (Year: 2016).*
Bell, "Importance of Postprandial Glucose Control", 2001, Southern Medical Association, 94, Abstract only (Year: 2001).*
Abdullah et al., "The magnitude of association between overweight and obesity and the risk of diabetes: A meta-analysis of prospective cohort studies", 2010, Diabetes Research and Clinical Practice, 89, pp. 309-319 (Year: 2010).*
Nagaoka, "Yogurt Production", Lactic Acid Bacteria: Methods and Protocols, available online 2018, Springer Nature, 1887, pp. 45-54 (Year: 2018).*
Courchesne-Loyer et al. "Emulsification increases the acute ketogenic effect and bioavailability of medium- chain triglycerides in humans", Current Developments in Nutrition, Jul. 1, 2017, vol. 1, No. 7, 32 pages, XP55621372 (Year: 2017).*

(Continued)

*Primary Examiner* — Brenda L Coleman
*Assistant Examiner* — Madeline E Braun
(74) *Attorney, Agent, or Firm* — K&L Gates LLP (57) ABSTRACT

A method reduces postprandial glucose from a meal. The method includes orally administering to an individual a composition containing medium chain triglycerides (MCT) and then subsequently orally administering the meal to the individual after the oral administration of the composition containing the MCTs and within about one hour of the oral administration of the composition containing the MCTs. For example, the meal can be administered about thirty minutes after the administration of the composition containing the MCTs. The postprandial glucose is reduced relative to postprandial glucose from (i) postprandial glucose from administration of an identically formulated composition containing MCTs at approximately the same time as the administration of the meal and (ii) postprandial glucose from administration of the meal without any MCTs within about one hour before or within about one hour afterward. The composition containing the MCTs can be a liquid oral nutritional supplement (ONS) providing incomplete nutrition.

14 Claims, 1 Drawing Sheet

(56) References Cited

OTHER PUBLICATIONS

Xin et al., "Nutritional Ketosis Increases NAD+/NADH Ratio in Healthy Human Brain: An in Vivo Study by 31P-MRS", Frontiers in Nutrition, vol. 5, Jul. 12, 2018, pp. 1-8.

Myette-Cote et al., "Prior Ingestion of Exogenous Ketone Monoester Attenuates the Glycaemic Response to an Oral Glucose Tolerance Test in Healthy Young Individuals", The Journal of Physiology, vol. 596, Issue No. 8, 2018, pp. 1385-1395.

Japanese Office Action for Appl No. 2021-551585 dated Feb. 13, 2024.

European Office Action for Appl No. 20 713 864.5-1112 dated Jan. 3, 2024.

St-Onge et al. "Impact of medium and long chain triglycerides consumption on appetite and food intake in overweight men" European Journal of Clinical Nutrition, 2014, vol. 68, pp. 1134-1140.

Yost et al. "Dietary Substitution of Medium Chain Triglycerides in Subjects with Non-Insulin-Dependent Diabetes Mellitus in an Ambulatory Setting: Impact on Glycemic Control and Insulin-Mediated Glucose Metabolism" Journal of the American College of Nutrition, 1994, vol. 13, No. 6, pp. 615-622.

Flatt et al. "Effects of dietary fat on postprandial substrate oxidation and on carbohydrate and fat balances" The Journal of Clinical Investigation, 1985, vol. 76, No. 3, pp. 1019-1024.

Gee et al., "Efficacy of Low Residue Enteral Formula Versus Clear Liquid Diet during Bowel Preparation for Colonoscopy: A Randomised Controlled Pilot Trial", Journal of Coloprotology, vol. 39, Issue No. 1, 2019, pp. 62-66.

Japanese Office Action for Appl No. 2021-551585 dated May 14, 2024, 4 pages.

\* cited by examiner

METHODS USING MEDIUM CHAIN TRIGLYCERIDES ADMINISTERED PRIOR TO A MEAL TO DECREASE POSTPRANDIAL GLUCOSE FROM THE MEAL

CROSS REFERENCE TO RELATED APPLICATIONS

The present application is a National Stage of International Application No. PCT/EP2020/057716, filed on Mar. 20, 2020, which claims priority to U.S. Provisional Patent Application No. 62/822,271, filed on Mar. 22, 2019, the entire contents of which are being incorporated herein by reference.

BACKGROUND

The present disclosure generally relates to administration of medium chain triglycerides (MCTs) before subsequent administration of a meal, for example administration of MCTs about thirty minutes before the meal, and their abilities to decrease postprandial glucose (PPG) blood level.

Diabetes is a metabolic condition characterized primarily by high blood glucose levels that result from the body's inability to make or use insulin. Hyperglycemia can lead to numerous clinical complications including blindness, limb amputations, heart attack or stroke.

The most common types of diabetes are insulin-dependent diabetes (Type-1 diabetes T1D) and non-insulin-dependent diabetes (Type-2 diabetes T2D). T2D is by far the most abundant type, and the increase in Type-2 diabetes (T2D) is mainly driven by increasing obesity rates.

Additionally, pre-diabetic conditions, defined as having a blood glucose higher than normal but not high enough to be diagnosed as diabetic, are contributing significantly to the strong rise of the diabetic population.

The pathophysiology of the development of Type-2 diabetes is complex and multifactorial. Obesity, sedentary life style, and/or increased age may lead to insulin resistance and to increased circulating insulin concentrations over time. At some point, a loss of control of blood glucose begins to emerge, resulting in impaired glucose tolerance (IGT) or impaired fasting glucose (IFG) and may ultimately result in Type-2 diabetes. Therefore, IGT and IFG refer to metabolic states intermediate between normal glucose homeostasis and diabetes.

A further test, the oral glucose tolerance test (OGTT), may be performed to assess whether the patient is diabetic or has IGT. The OGTT consists of a glucose drink containing 75 g of glucose. The patient's blood sugar level is measured at one and two hours following administration of the drink.

Glucose is an essential nutrient for the human body, so its circulating levels must be carefully maintained constant in order to supply adequate amounts to peripheral tissues. The liver plays a central role in glucose homeostasis by balancing uptake and storage of glucose via glycogenesis and its release via glycogenolysis and gluconeogenesis. An impairment of glucose homeostasis is a typical feature of Type-2 diabetes. Patients with Type-2 diabetes exhibit increased hepatic glucose production (HGP), which is identified as the main cause of fasting hyperglycaemia and is associated with a reduced plasma glucose clearance (Gastaldelli A, et al., Diabetes 2000; 49:1367-1373), and also a 25-45% reduced synthesis of glycogen compared with non-diabetic subjects (Roden M, et al., Best Pract Res Clin Endocrinol Metab. 2003; 17:365-83).

Optimal glycemic control is fundamental to the management of diabetes. Both fasting plasma glucose (FPG) and postprandial plasma glucose (PPG) levels correlate with the risk of complications and contribute to the measured glycated hemoglobin (A1C) value. A1C levels >7.0% are associated with a significantly increase risk of both microvascular and cardiovascular (CV) complications. PPG is an important component of overall hyperglycemia and may be the predominant component in patients who are closer to A1C goal and in older adults.

PPG are determined by several factors, such as the total caloric value of a meal, macronutrient composition, and carbohydrate quality (e.g., glycemic index/load), all of which may be monitored and controlled. However, multiple other factors involved in diseases such as T2D are more complex because they cannot be controlled and are variable between individuals. These include gastric emptying rate, intestinal absorption rate, enteroendocrine incretin secretion, incretin sensitivity, pancreatic beta-cell insulin secretory function, hepatic insulin extraction, hepatic glucose production, glucose effectiveness, glucose uptake in all tissues (especially brain, adipose, liver, muscle), insulin sensitivity, and renal glucose reabsorption Limiting blood glucose peaks after a meal in diabetic subjects constitutes an important target of the overall glycemic control strategy. Uncontrolled PPG is common in diabetes. It contributes to overall hyperglycemia and is associated with poor outcomes. Treatment options that specifically target PPG are, therefore, critical components to achieving and sustaining glycemic control in patients with Type-1 diabetes (T1D) and Type-2 diabetes (T2D), and might prevent prediabetic subjects to advance to a diagnosed diabetic condition.

Actual treatments for T2D comprise several classes of drugs, which can be used alone or in combination with insulin. Most traditional oral antidiabetic drugs (OAD), such as metformin and thiazolidinediones, primarily target FPG and have little direct impact on PPG levels, or target both FPG and PPG, with a significant increase in hypoglycemia events.

Drug classes that target specifically PPG include Meglitinides, alpha-glucosidase inhibitors, GLP1-1 Receptor Agonist, DPP4 inhibitors, Amylin agonist or Prandial Insulin. Their main drawbacks include concomitant increase in postprandial insulin secretion that can lead to worsening of the insulin resistance and hypoglycemia, modest efficacy on A1C, GI side effects, and need for subcutaneous injection.

Hence, efficacious, safe and convenient treatment options that target selectively PPG are critical components to achieving and sustaining glycemic control in patients with T1D and T2D, as well as in pre-diabetic conditions.

SUMMARY

Several publications have reported an effect of medium chain triglycerides (MCT) on blood glucose levels and also an effect of MCT taken with a meal on post-prandial glucose. Nevertheless, to the best knowledge of the present inventors, the impact of specific timing of the administration of the MCT on the effect on post-prandial blood glucose has not been reported before the present patent application. To the best knowledge of the present inventor, the impact of specific timing of a meal on the effect of MCT has not been reported before the present patent application. As set forth in greater detail later herein, the inventor conducted a study that surprisingly and unexpectedly showed that an MCT emulsion administered prior to a meal provides a significant decrease in postprandial glucose compared to a meal given without MCT or to a meal given concurrently with MCT. Also surprisingly, the intake of MCT with or prior to the meal while providing significant reduction in post-prandial glucose did not effect insulin levels significantly.

Accordingly, in a non-limiting embodiment, the present disclosure provides a method of reducing postprandial glucose from a meal. The method comprises orally administering a composition comprising medium chain triglycerides (MCT) to an individual and then subsequently orally administering the meal to the individual after the oral administration of the composition comprising the MCTs and within about one hour of the oral administration of the composition comprising the MCTs, preferably at least about ten minutes after the oral administration of the composition comprising the MCTs and within about one hour of the oral administration of the composition comprising the MCTs, for instance at least about fifteen minutes after the oral administration of the composition comprising the MCTs and within about forty minutes after the oral administration of the composition comprising the MCTs, such as about thirty minutes after the oral administration of the composition comprising the MCTs. In an embodiment, the individual (i) has at least one condition selected from the group consisting of obesity, diabetes and pre-diabetes and/or (ii) is an aging subject such as an older adult or an elderly subject.

For example, the oral administration of the composition comprising the MCTs can be between about ten minutes before the administration of the meal and about one hour before the administration of the meal, at least about fifteen minutes before the administration of the meal and within about forty minutes before the administration of the meal, such as about thirty minutes before the administration of the meal. Preferably the individual does not consume any food product other than optional water in a time period between (i) the administration of the composition comprising the MCTs and (ii) the administration of the meal.

The composition can be administered to the individual in a serving that provides up to about 30 g MCTs/serving, for example about 5 g to about 30 g MCTs/serving, about 10 g to about 30 g MCTs/serving, or about 15 g to about 30 g MCTs/serving. At least a portion of the MCTs can comprise at least one of octanoic acid or decanoic acid. At least a portion of the MCTs can be metabolized into ketones selected from the group consisting of β-hydroxy butyrate, aceto-acetate and mixtures thereof.

In an embodiment, the postprandial glucose achieved by the administration of the composition comprising the MCTs before the administration of the meal (e.g., administration of the MCTs about thirty minutes before the meal) is lower than postprandial glucose from a meal administered at the same time as the composition comprising MCTs. Additionally or alternatively, the postprandial glucose achieved by the administration of the composition comprising MCTs before the administration of the meal (e.g., administration of the MCTs about thirty minutes before the meal) is lower than postprandial glucose from administration of the meal without any MCTs.

The composition comprising the MCTs can be an oral nutritional supplement (ONS) that provides incomplete nutrition. Optionally the composition can comprise one or more ingredients additional to MCTs, for example an optional additional component selected from the group consisting of a protein, a carbohydrate, a lipid, a vitamin, a mineral, excipients, emulsifiers, stabilizers, and mixtures thereof. The final formulation can be in a liquid or gel format ready to consumed, or in a powder format to be reconstituted in water before use.

In another embodiment, the present disclosure provides a method of treating or preventing at least one condition for which reduced postprandial glucose is beneficial. The method comprises orally administering a composition comprising MCTs to an individual in need thereof or at risk thereof and then subsequently orally administering a meal to the individual after the oral administration of the composition comprising the MCTs and within about one hour of the oral administration of the composition comprising the MCTs, preferably at least about ten minutes after the oral administration of the composition comprising the MCTs and within about one hour of the oral administration of the composition comprising the MCTs, for example at least about fifteen minutes after the oral administration of the composition comprising the MCTs and within about forty minutes after the oral administration of the composition comprising the MCTs, such as about thirty minutes after the oral administration of the composition comprising the MCTs. The at least one condition treated or prevented is preferably selected from the group consisting of obesity, pre-diabetes, diabetes, and effects of being elderly.

Additional features and advantages are described in, and will be apparent from, the following Detailed Description and the Figures.

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

All percentages are by weight of the total weight of the composition unless expressed otherwise. Similarly, all ratios are by weight unless expressed otherwise. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth. Ranges defined using "between" include the referenced endpoints.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. "Consisting essentially of" means that the embodiment or component thereof comprises more than 50 wt. % of the individually identified components, preferably at least 75 wt. % of the individually identified components, more preferably at least 85 wt. % of the individually identified components, most preferably at least 95 wt. % of the individually identified components, for example at least 99 wt. % of the individually identified components.

Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

"Animal" includes, but is not limited to, mammals, which includes but is not limited to rodents, aquatic mammals, domestic animals such as dogs and cats, farm animals such as sheep, pigs, cows and horses, and humans. Where "animal," "mammal" or a plural thereof is used, these terms also apply to any animal that is capable of the effect exhibited or intended to be exhibited by the context of the passage, e.g., an animal benefitting from reduced postprandial glucose. While the term "individual" or "subject" is often used herein to refer to a human, the present disclosure is not so limited. Accordingly, the term "individual" or "subject" refers to any animal, mammal or human that can benefit from the methods and compositions disclosed herein.

The relative terms "improved," "reduced," "enhanced" and the like refer to the effects of the method disclosed herein on postprandial glucose, particularly the administration of a composition containing MCTs before administration of a meal (e.g., about thirty minutes before the meal), relative to administration of an identically formulated meal but administered without the MCTs (e.g., no MCTs within about one hour of the meal) or relative to administration of an identically formulated meal concurrently with the MCTs (i.e., at approximately the same time).

As used herein, the terms "treat" and "treatment" mean to administer a composition as disclosed herein to a subject having a condition in order to lessen, reduce or improve at least one symptom associated with the condition and/or to slow down, reduce or block the progression of the condition. The terms "treatment" and "treat" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The terms "treatment" and "treat" do not necessarily imply that a subject is treated until total recovery. The terms "treatment" and "treat" also refer to the maintenance and/or promotion of health in an individual not suffering from a disease but who may be susceptible to the development of an unhealthy condition. The terms "treatment" and "treat" are also intended to include the potentiation or otherwise enhancement of one or more primary prophylactic or therapeutic measures. As non-limiting examples, a treatment can be performed by a patient, a caregiver, a doctor, a nurse, or another healthcare professional.

The terms "prevent" and "prevention" mean to administer a composition as disclosed herein to a subject is not showing any symptoms of the condition to reduce or prevent development of at least one symptom associated with the condition. Furthermore, "prevention" includes reduction of risk, incidence and/or severity of a condition or disorder. As used herein, an "effective amount" is an amount that treats or prevents a deficiency, treats or prevents a disease or medical condition in an individual, or, more generally, reduces symptoms, manages progression of the disease, or provides a nutritional, physiological, or medical benefit to the individual.

"Overweight" is defined for a human as a body mass index (BMI) between 25 and 30 kg/m$^2$. "Obese" is defined for a human as a BMI of at least 30 kg/m$^2$, for example 30-39.9 kg/m$^2$.

"Diabetes" encompasses both the type I and type II forms of the disease. Non-limiting examples of risk factors for diabetes include: waistline of more than 40 inches for men or 35 inches for women, blood pressure of 130/85 mmHg or higher, triglycerides above 150 mg/dl, fasting blood glucose greater than 100 mg/dl or high-density lipoprotein of less than 40 mg/dl in men or 50 mg/dl in women. Therefore, an "individual at risk of diabetes" may have one or more of these factors present.

"Pre-diabetes" means that the individual has at least one of the following characteristics: a glycated hemoglobin (A1C) level between 5.7 and 6.4 percent, a fasting blood glucose from 100 to 125 mg/dL (5.6 to 7.0 mmol/L), or a blood sugar level from 140 to 199 mg/dL (7.8 to 11.0 mmol/L).

As used herein, "administering" includes another person providing a referenced composition to an individual so that the individual can consume the composition and also includes merely the act of the individual themselves consuming a referenced composition.

The terms "food," "food product" and "food composition" mean a composition that is intended for ingestion by an individual, such as a human, and that provides at least one nutrient to the individual. "Food" and its related terms include any food, feed, snack, food supplement, treat, meal substitute, or meal replacement, whether intended for a human or an animal. Animal food includes food or feed intended for any domesticated or wild species. In preferred embodiments, a food for an animal represents a pelleted, extruded, or dry food, for example, extruded pet foods such as foods for dogs and cats.

The terms "serving" or "unit dosage form," as used herein, are interchangeable and refer to physically discrete units suitable as unitary dosages for human and animal subjects, each unit containing a predetermined quantity of the composition comprising MCTs disclosed herein in an amount sufficient to produce the desired effect, preferably in association with a pharmaceutically acceptable diluent, carrier or vehicle. The specifications for the unit dosage form depend on the particular compounds employed, the effect to be achieved, and the pharmacodynamics associated with each compound in the host. In an embodiment, the unit dosage form can be a predetermined amount of liquid housed within a container such as a bottle.

An "oral nutrition supplement" or "ONS" is a composition comprising at least one macronutrient and/or at least one micro nutrient, for example in a form of sterile liquids, semi-solids or powders, and intended to supplement other nutritional intake such as that from food. Non-limiting examples of commercially available ONS products include MERITENE®, BOOST®, NUTREN® and SUSTAGEN®. In some embodiments, an ONS can be a beverage in liquid form that can be consumed without further addition of liquid, for example an amount of the liquid that is one serving of the composition.

As used herein, "incomplete nutrition" refers to preferably nutritional products that do not contain sufficient levels of macronutrients (protein, fats and carbohydrates) or micronutrients to be sufficient to be a sole source of nutrition for the animal to which the nutritional product is being administered.

A "kit" means that the components of the kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof.

A triglyceride (also known as a triacylglycerol or a triacylglyceride) is an ester that is derived from glycerol and three fatty acids. Fatty acids may be either unsaturated or saturated. Fatty acids which are not attached to other molecules are referred to as free fatty acids (FFA).

A medium-chain triglyceride (MCT) is a triglyceride in which all three fatty acid moieties are medium-chain fatty acid moieties. As defined herein, medium-chain fatty acids (MCFA) are fatty acids that have 6 to 12 carbon atoms. Medium-chain fatty acids with 8 carbon atoms may be referred to herein as "C8 fatty acids" or "C8." Medium-chain fatty acids with 10 carbon atoms may be referred to herein as "C10 fatty acids" or "C10."

The term "fatty acid moiety" refers to the part of the MCT that originates from a fatty acid in an esterification reaction with glycerol. In a non-limiting example, an esterification reaction between glycerol and only octanoic acid would result in a MCT with octanoic acid moieties. In another non-limiting example, an esterification reaction between glycerol and only decanoic acid would result in a MCT with decanoic acid moieties.

Octanoic acid (also known as caprylic acid) is a saturated fatty acid of the formula $CH_3(CH_2)_6COOH$.

Decanoic acid (also known as capric acid) is a saturated fatty acid of the formula $CH_3(CH_2)_8COOH$.

Embodiments

An aspect of the present disclosure is a method of reducing postprandial glucose from a meal. The method comprises orally administering a composition comprising medium chain triglycerides (MCT) to an individual and then subsequently orally administering the meal to the individual after the oral administration of the composition comprising the MCTs and within about one hour of the oral administration of the composition comprising the MCTs, preferably at least about ten minutes after the oral administration of the composition comprising the MCTs and within about one hour of the oral administration of the composition comprising the MCTs, more preferably at least about fifteen minutes after the oral administration of the composition comprising the MCTs and within about forty minutes of the oral administration of the composition comprising the MCTs, for example about thirty minutes after the oral administration of the composition comprising the MCTs. As used herein, "subsequently" means at least about five minutes later, preferably at least about ten minutes later, more preferably at least about fifteen minutes later, even more preferably at least about twenty minutes later, yet more preferably at least about twenty-five minutes later, most preferably about thirty minutes later.

In another embodiment, the present disclosure provides a method of treating or preventing at least one condition for which reduced postprandial glucose (PPG) is beneficial. The method comprises orally administering a composition comprising MCTs to an individual in need thereof or at risk thereof and then subsequently orally administering a meal to the individual after the oral administration of the composition comprising the MCTs and within about one hour of the oral administration of the composition comprising the MCTs, preferably at least about ten minutes after the oral administration of the composition comprising the MCTs and within about one hour of the oral administration of the composition comprising the MCTs, more preferably at least about fifteen minutes after the oral administration of the composition comprising the MCTs and within about forty minutes of the oral administration of the composition comprising the MCTs, for example about thirty minutes after the oral administration of the composition comprising the MCTs. The at least one condition treated or prevented is preferably selected from the group consisting of obesity, pre-diabetes, diabetes, and effects of being elderly.

As used herein, "meal" refers to one or more food products consumed at substantially the same time as each other; preferably such that at least one macronutrient and at least one micronutrient are provided by consuming the meal; more preferably such that one or more proteins, one or more carbohydrates, one or more fats, one or more vitamins and one or more minerals are provided by consuming the meal. Preferably the meal comprises a plurality of food products. In an embodiment, the meal provides 200 kcal to 1,000 kcal to the individual, preferably 250 kcal to 900 kcal, more preferably 300 kcal to 850 kcal, and most preferably 350 kcal to 800 kcal. In an embodiment, the meal is substantially free of MCTs (i.e., less than 2.5 wt. %, preferably less than 2.0 wt. %, more preferably less than 1.0 wt. %, most preferably less than 0.5 wt. % MCTs) or completely free of MCTs.

The administration of the composition comprising the MCTs can be between about ten minutes before the administration of the meal and about one hour before the administration of the meal, preferably between about fifteen minutes before the administration of the meal and about forty minutes before the administration of the meal, such as about thirty minutes before the administration of the meal. Preferably the individual does not consume any food product other than optional water in the time period between the administration of the composition comprising the MCTs and the administration of the meal.

In some embodiments, the meal is breakfast. For example, the composition comprising the MCTs can be administered to the individual before breakfast, and then the breakfast can be subsequently administered to the individual after the administration of the composition comprising MCTs. For example, the breakfast can be administered between about ten minutes after the administration of the composition comprising MCTs and about one hour after the administration of the composition comprising MCTs, preferably at least about fifteen minutes after the oral administration of the composition comprising the MCTs and within about forty minutes after the oral administration of the composition comprising the MCTs, for example about thirty minutes after the administration of the composition comprising MCTs.

As used herein, "breakfast" is the first meal consumed by the individual on the particular day. For example, breakfast can be consumed before noon according to the local time of the individual, preferably before 11:00 AM according to the local time of the individual, more preferably before 10:00 AM according to the local time of the individual, most preferably before 9:00 AM according to the local time of the individual, but after the individual has awakened from sleep and/or after 4:00 AM according to the local time of the individual, preferably after 5:00 AM according to the local time of the individual, more preferably after 6:00 AM according to the local time of the individual, most preferably after 7:00 AM according to the local time of the individual.

In an embodiment, the postprandial glucose achieved by the administration of the composition comprising the MCTs before the administration of the meal (e.g., administration of the MCTs about thirty minutes before the meal) is lower than postprandial glucose from administration of an identically formulated composition comprising MCTs at approximately the same time as the administration of the meal. Additionally or alternatively, the postprandial glucose achieved by the administration of the composition comprising MCTs before the administration of the meal (e.g., administration of the MCTs about thirty minutes before the meal) is lower than postprandial glucose from administration of the meal without any MCTs within about one hour before or within about one hour afterward.

In an embodiment, the composition is administered to an individual in a serving that provides at least about 5 g MCTs, for example at least about 10 g MCTs, such as at least about 15 g MCTs. In some embodiments, up to 30 g MCTs are administered per serving of the composition.

The MCTs comprise three fatty acid moieties, each of which independently has between 6-12, 6-11, 6-10, 7-12, 7-11, 7-10, 8-12, 8-11 or 8-10 carbon atoms. In an embodiment, at least a portion of the MCTs contain one or more octanoic acid moieties. In an embodiment, at least a portion of the MCTs contain one or more decanoic acid moieties.

Preferably the composition contains one or more natural sources that provide at least a portion of the MCTs. Non-limiting examples of suitable natural sources of MCTs include plant sources such as coconuts, coconut oil, palm kernels, and palm kernel oils, and also include animal sources such as milk. For example, decanoic acid and octanoic acid form about 5-8% and 4-10% of the fatty acid composition of coconut oil, respectively.

Additionally or alternatively, at least a portion of the MCTs may be synthesized by esterification of glycerol with one or more medium-chain fatty acids (MCFA) with a tail of 6 to 12 carbon atoms. For example, a homotriglyceride comprising three fatty acid moieties each with 8 carbon atoms can be synthesized by esterification of glycerol with C8 fatty acids (e.g., octanoic acid), and a homotriglyceride comprising three fatty acid moieties each with 10 carbon atoms can be synthesized by esterification of glycerol with C10 fatty acids (e.g., decanoic acid).

In an embodiment, the composition comprises MCTs comprising at least one octanoic acid moiety or decanoic acid moiety, and the composition is free from or substantially free from any other triglycerides. As used herein, the term "free from any other triglycerides" means that the composition does not comprise any triglycerides that do not contain at least one octanoic acid moiety or decanoic acid moiety. As used herein, the term "substantially free from any other triglycerides" means that the composition may contain traces of other triglycerides, i.e., less than 5 mol %, preferably less than 3 mol %, more preferably less than 2 mol %, even more preferably less than 1 mol % or most preferably less than 0.5 mol %.

In some embodiments, the composition comprising MCTs may be in the form of a nutritional composition or a nutritional supplement. The term "nutritional supplement" refers to a product which is intended to supplement the general diet of a subject. For example, the composition comprising the MCTs can be an oral nutritional supplement (ONS) that provides incomplete nutrition. The ONS can comprise one or more ingredients additional to MCTs, for example an additional component selected from the group consisting of a protein, a carbohydrate, a lipid, a vitamin, a mineral, and mixtures thereof. Moreover, in an alternative embodiment, the composition comprising the MCTs may be in the form of a complete nutritional product. The term "complete nutritional product" refers to a product which is capable of being the sole source of nutrition for the subject.

In a preferred embodiment, the composition comprises the MCTs emulsified in a mixture of one or more of protein, lipid or carbohydrate and optionally further comprises a dietary flavoring (e.g., vanilla).

Non-limiting examples of suitable proteins include animal proteins, such as milk protein, meat protein and egg protein; or vegetable proteins, such as soy protein, wheat protein, rice protein, pea protein, corn protein, canola protein, oat protein, potato protein, peanut protein, and any proteins derived from beans, buckwheat or lentils. Milk proteins, such as casein and whey, and soy proteins may be preferred for some applications. If the protein is a milk protein or a milk protein fraction, the protein may be, for example, sweet whey, acid whey, α-lactalbumin, β-lactoglobulin, bovine serum albumin, acid casein, caseinates, α-casein, β-casein and/or γ-casein.

Non-limiting examples of suitable carbohydrates include mono-saccharides and/or di-saccharides, slowly digested fully caloric carbohydrates, oligosaccharides, or mixtures thereof. Particular non-limiting examples include maltodextrin, maltose, high-maltose corn syrup, fructose, galactose, sucrose, lactose or a mixture of thereof.

Non-limiting examples of suitable lipids additional to the MCTs include monoacylglycerols (MAG), diacylglycerol (DAG), long chain triglycerides (LCT), short chain fatty acids (SCFA), branched chain fatty acids (BCFA), structured MAG, structured DAG, fatty acids (free and/or bound, e.g., esterified to glycerol or as ethyl esters), phospholipids, lyso-phospholipids, sphingomyelin, gangliosides, specialized pro-resolving mediators (SPMs), or mixtures thereof. The fatty acids that are free and/or bound may include one or more of linoleic acid (18:2n-6), alpha-linolenic acid (18:3n-3), dihomogammalinolenic acid (20:3n-6), gamma-linolenic acid (GLA, 18:3n-6), stearidonic acid (18:4n-3), docosapentaenoic acid (DPA, 22:5n-3) or mixtures thereof. The source of the lipids may be one or more of animal, plant, fermented, microalgae, GMO, non-GMO or mixtures thereof.

An embodiment of the composition comprising the MCTs is a non-complete liquid ONS that can further comprise protein, e.g., milk protein concentrate. In an embodiment of this non-complete liquid ONS, the composition can consist essentially of water, the MCTs and the protein (e.g., milk protein concentrate) and optionally a flavoring. Preferably the non-complete liquid ONS is a "shot," for example having a volume of about 40 mL to about 400 mL, more preferably about 50 mL to about 300 mL, most preferably about 70 mL. Preferably the non-complete liquid ONS is in a unit dosage form that provides at least about 5 g MCTs, more preferably at least about 10 g MCTs, most preferably at least about 15 g MCTs, and in some embodiments, no greater than 30 g MCTs. In a particularly preferred embodiment, the non-complete liquid ONS is an MCT emulsion.

The proteins can be 0 wt. % to about 50 wt. % of the composition, preferably about 0.1 wt. % to about 20 wt. % of the composition, more preferably about 1.0 wt. % to about 10.0 wt. % of the composition, most preferably about 5.0 wt. % of the composition. The proteins can be 0 g to about 30 g/serving of the composition, preferably about 5 g to about 30 g/serving of the composition.

Another embodiment of the composition comprising the MCTs is a complete liquid meal replacement that can further comprise protein (e.g., one or more of whey, casein, milk protein concentrate), additional lipid (e.g., long chain triglycerides (LCT)) and carbohydrate (lactose and/or glucose).

In an embodiment of this complete liquid meal replacement, the composition can consist essentially of water, the MCTs the protein, the additional lipid, the carbohydrates, and optionally a flavoring. Preferably the complete liquid meal replacement is a "shot," for example having a volume of about 40 mL to about 400 mL, more preferably about 50 mL to about 300 mL, most preferably about 70 mL. Preferably the complete liquid meal replacement is in a unit dosage form that provides at least about 5 g MCTs, more preferably at least about 10 g MCTs, most preferably at least about 15 g MCTs, and in some embodiments, no greater than 30 g MCTs. In a particularly preferred embodiment, the complete liquid meal replacement is an MCT emulsion.

The format of the MCT product can contain excipients, emulsifiers, stabilizers and mixtures thereof, and the final formulation can be in a liquid format ready to be consumed, or in a powder format to be reconstituted in water before use.

The MCTs can be about 10 to about 120 g/L of the composition. The proteins can be 0 to about 200 g/L of the composition, preferably about 10 g/L to about 200 g/L of the composition. The additional lipids can be 0 to about 120 g/L of the composition, preferably about 10 g/L to about 200 g/L of the composition. The carbohydrates can be 0 to about 200 g/L of the composition, preferably about 10 g/L to about 200 g/L of the composition.

In some embodiments, the composition comprising the MCTs is provided in a kit also providing at least a portion of the meal. For example, the composition comprising the MCTs and at least a portion of the meal can be provided in separate containers relative to each other but both housed within a larger container.

The composition comprising the MCTs may further comprise one or more additional components such as minerals; vitamins; salts; or functional additives including, for example, palatants, colorants, emulsifiers, antimicrobial or other preservatives. Non-limiting examples of suitable minerals for the compositions disclosed herein include calcium, phosphorous, potassium, sodium, iron, chloride, boron, copper, zinc, magnesium, manganese, iodine, selenium, chromium, molybdenum, fluoride and any combination thereof. Non-limiting examples of suitable vitamins for the compositions disclosed herein include water-soluble vitamins (such as thiamin (vitamin B1), riboflavin (vitamin B2), niacin (vitamin B3), pantothenic acid (vitamin B5), pyridoxine (vitamin B6), biotin (vitamin B7), myo-inositol (vitamin B8) folic acid (vitamin B9), cobalamin (vitamin B12), and vitamin C) and fat-soluble vitamins (such as vitamin A, vitamin D, vitamin E, and vitamin K) including salts, esters or derivatives thereof. Inulin, taurine, carnitine, amino acids, enzymes, coenzymes, and any combination thereof may be included in various embodiments.

The composition may further comprise one or more agents that promote or sustain general neurologic health or further enhance cognitive function. Examples of such agents include choline, phosphatidylserine, alpha-lipoic acid, CoQ10, acetyl-L-carnitine, herbal extracts (such as *Gingko biloba, Bacopa monniera, Convolvulus pluricaulis* and *Leucojum aestivum*), omega-3 or omega-6 polyunsaturated fatty acids (such as eicosapentaenoic acid, docosapentaenoic acid or docosahexaenoic acid as free fatty acid), aliphatic ester (such as ethylester, triglycerides or monoglycerides formats), and fish oil extracts.

The subject may be a mammal such as a human, canine, feline, equine, caprine, bovine, ovine, porcine, cervine or a primate. Preferably the subject is a human. In an embodiment, the subject is an infant. The infant may, for example, be a human such as a newborn infant (i.e., a baby under 28 days of age) or a premature infant (i.e., a baby born before 37 completed weeks of gestation).

In an embodiment, the subject is an aging subject. For instance, a subject may be an aging subject when it has reached 40, 50, 60, 66, 70, 75, or 80% of its likely lifespan. A determination of lifespan may be based on actuarial tables, calculations, or estimates, and may consider past, present, and future influences or factors that are known to positively or negatively affect lifespan. Consideration of species, gender, size, genetic factors, environmental factors and stressors, present and past health status, past and present nutritional status, and stressors may be taken into consideration when determining lifespan. The aging subject may, for example, be a human subject over the age of 40, 45, 50, 55, 60, 65, 70, 75, 80, 85, 90, 95 or 100 years old.

Further in this regard, the term "elderly" in the context of a human means an age from birth of at least 60 years, preferably above 63 years, more preferably above 65 years, and most preferably above 70 years. The term "older adult" in the context of a human means an age from birth of at least 45 years, preferably above 50 years, more preferably above 55 years, and includes elderly individuals.

All references herein to treatment include curative, palliative and prophylactic treatment. Treatment may also include arresting progression in the severity of a disease. Both human and veterinary treatments are within the scope of the present disclosure. Preferably the composition comprising the MCTs is administered in a serving or unit dosage form that provides a therapeutically effective or prophylactically effective amount of the MCTs and/or provides an amount of MCTs metabolized into a therapeutically effective or prophylactically effective amount of ketones.

In view of the above disclosures, an embodiment provided herein is a method of reducing postprandial glucose from a meal, the method comprising: orally administering to an individual a composition comprising medium chain triglycerides (MCT); and subsequently orally administering the meal to the individual after the oral administration of the composition comprising the MCTs and within about one hour of the oral administration of the composition comprising the MCTs.

The postprandial glucose in the individual is preferably reduced relative to postprandial glucose from at least one comparative situation selected from the group consisting of (i) oral administration of the meal and the composition comprising the MCTs to the individual at approximately the same time and (ii) oral administration of the meal without any MCTs within about one hour before or within about one hour afterward.

The individual preferably (i) has at least one condition selected from the group consisting of obesity, diabetes and pre-diabetes and/or (ii) is an aging subject such as an older adult or an elderly subject. The composition comprising the MCTs can be a liquid. The composition can be administered to the individual in a serving comprising at least about 15.0 g of the MCTs up to about 30.0 g of the MCTs. The composition can comprise the MCTs emulsified in at least one additional component selected from the group consisting of a protein, a lipid and a carbohydrate.

The meal can be administered between about ten minutes after the administration of the composition comprising the MCTs and about one hour after the administration of the composition comprising the MCTs, preferably between about fifteen minutes after the administration of the composition comprising the MCTs and about forty minutes after the administration of the composition comprising the MCTs. For example, the meal can be administered about thirty minutes after the administration of the composition comprising the MCTs.

At least a portion of the MCTs can be at least one of octanoic acid or decanoic acid. At least a portion of the MCTs can be metabolized into ketones be selected from the group consisting of β-hydroxy butyrate, acetone-acetate and mixtures thereof.

The meal can be breakfast. The composition can be a liquid incomplete nutrition oral nutritional supplement (ONS).

Preferably, the individual does not experience gastrointestinal side effects from the MCTs. Preferably, the individual does not consume any food products other than optional water during a time period from the oral administration of the composition comprising the MCTs to the individual to the oral administration of the meal to the individual.

Another embodiment provided herein is a method of treating or preventing a condition for which reduced postprandial glucose from a meal is beneficial, the method comprising: orally administering to the individual a composition comprising medium chain triglycerides (MCT); and subsequently orally administering the meal to the individual after the oral administration of the composition comprising the MCTs and within about one hour of the oral administration of the composition comprising the MCTs, preferably at least about ten minutes after the oral administration of the composition comprising the MCTs and within about one hour of the oral administration of the composition comprising the MCTs. The condition is preferably selected from the group consisting of obesity, pre-diabetes, diabetes, and effects of being elderly.

In an embodiment the meal can be administered between about fifteen minutes after the administration of the composition comprising the MCTs and about forty minutes after the administration of the composition comprising the MCTs. For example, the meal can be administered about thirty minutes after the administration of the composition comprising the MCTs.

Another embodiment provided herein is a kit for providing nutrition, the kit comprising: an orally administrable composition comprising the MCTs; at least a portion of a meal, stored separately in the kit from the orally administrable composition comprising the MCTs; and instructions to orally administer to an individual a composition comprising medium chain triglycerides (MCTs) and then subsequently orally administer to the individual a meal after the oral administration of the composition comprising the MCTs and within about one hour of the oral administration of the composition comprising the MCTs, preferably at least about ten minutes after the oral administration of the composition comprising the MCTs and within about one hour of the oral administration of the composition comprising the MCTs, more preferably at least about fifteen minutes after the oral administration of the composition comprising the MCTs and within about forty minutes after the oral administration of the composition comprising the MCTs, for example about thirty minutes after the oral administration of the composition comprising the MCTs.

EXAMPLE

The following non-limiting example presents clinical data developing and supporting the concepts of the present disclosure.

A metabolic study was conducted in healthy volunteers. Oral intake of a MCT emulsion (15 g MCT in 70 mL of a 5% aqueous protein solution) before (group A) or during (group B) administration of a standard breakfast meal. Plasma Glucose and Insulin were measured at various time point over 2 hours. Control group C received only breakfast.

MCT emulsion contained a MCT with a mixture of C8:C10 ratio of about 58:42. The protein was derived from whole milk protein.

Figure 1:
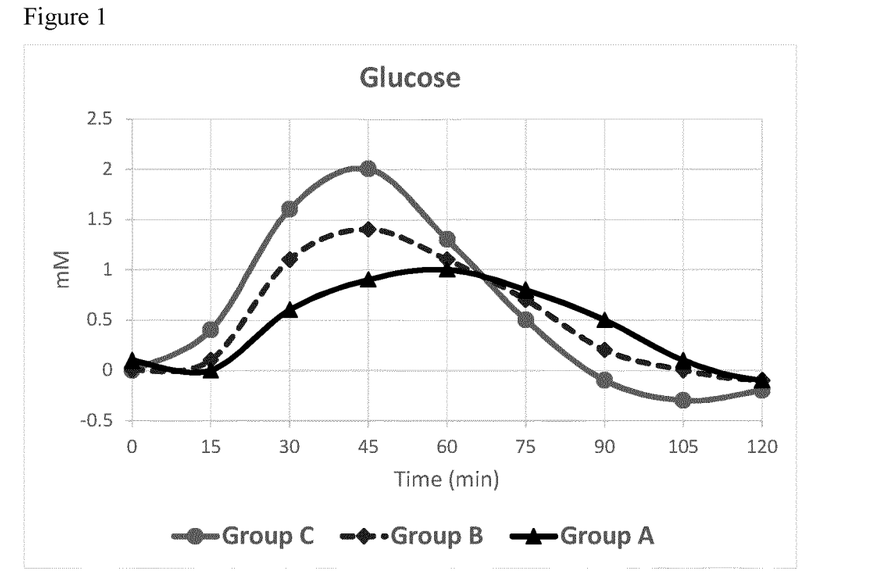
FIG. 1 is a graph showing mean glucose concentration (over baseline) over time from the metabolic study disclosed herein.

FIG. 1 illustrates the change in plasma glucose average of 13-14 subjects per group over time for group A, B, and C. Time 0 corresponds to ingestion of the breakfast.

Figure 2:
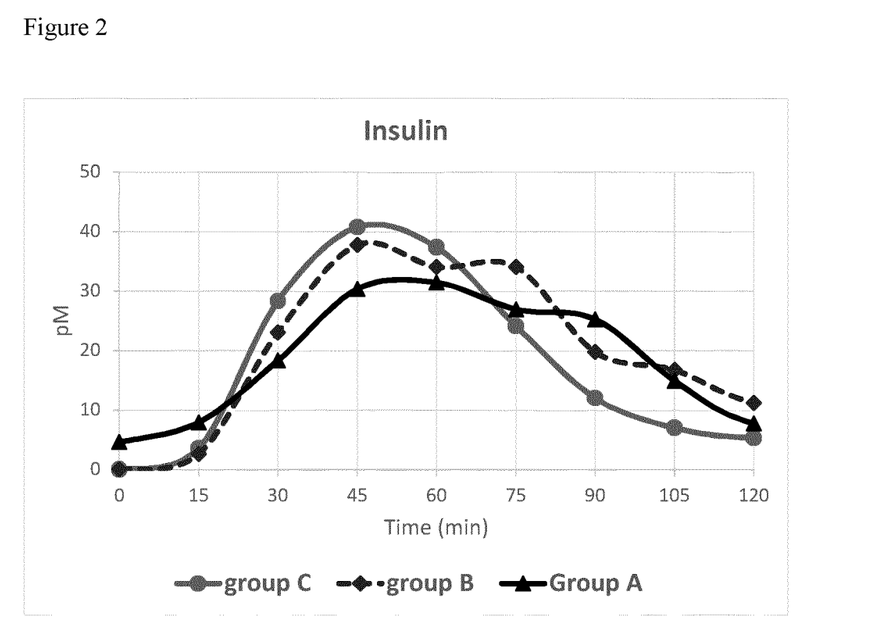
FIG. 2 is a graph showing mean insulin concentration (over baseline) over time from the metabolic study disclosed herein.

FIG. 2 illustrates the change in plasma insulin average of 13-14 subjects per group over time for group A, B, and C. Time 0 corresponds to ingestion of the breakfast.

Table 1 reports the incremental area under the curve (iAUC) of both glucose and insulin for groups A, B, and C. A statistically significant ($p<0.05$) 31% reduction was determined for iAUC glucose group A (MCT intake 30 min before the meal) compared group C (no MCT intake). No statistical difference was observed between groups for iAUC insulin.

TABLE 1

|  | Group A | Group B | Group C |
| --- | --- | --- | --- |
| Glucose iAUC mM*h | 1.1 | 1.4 | 1.6 |
| Insulin iAUC pM*h | 33.9 | 43.4 | 40.3 |

These results show that administration of MCT product before a meal significantly reduces the postprandial glucose response (PPG) without affecting insulin response.

It should be understood that various changes and modifications to the presently preferred embodiments described herein will be apparent to those skilled in the art. Such changes and modifications can be made without departing from the spirit and scope of the present subject matter and The invention is claimed as follows:

1. A method of reducing postprandial glucose in an individual from a meal, the individual having at least one condition selected from the group consisting of diabetes and pre-diabetes, the method comprising:

orally administering to the individual a composition comprising medium chain triglycerides (MCTs), wherein the composition is administered to the individual in a serving comprising at least about 15.0 g of the MCTs up to about 30.0 g of the MCTs; and subsequently orally administering the meal to the individual after the orally administering the composition comprising the MCTs and within about one hour of the orally administering the composition comprising the MCTs.

2. The method of claim 1, wherein the individual is an aging subject.

3. The method of claim 2, wherein the individual is elderly.

4. The method of claim 1, wherein the composition comprises the MCTs emulsified in at least one additional component selected from the group consisting of a protein, a lipid, a carbohydrate, and an emulsifier.

5. The method of claim 1, wherein the meal is administered between about ten minutes after the orally administering the composition comprising the MCTs and about one hour after the orally administering the composition comprising the MCTs.

6. The method of claim 1, wherein the meal is breakfast.

7. The method of claim 1, wherein at least a portion of the MCTs comprises at least one of octanoic acid or decanoic acid.

8. The method of claim 1, wherein the postprandial glucose in the individual is reduced relative to postprandial glucose from at least one comparative situation selected from the group consisting of (i) orally administering the meal and the composition comprising the MCTs to the individual at approximately the same time and (ii) orally administering the meal without any MCTs within about one hour before or within about one hour afterward.

9. The method of claim 1, wherein the composition is a liquid incomplete nutrition oral nutritional supplement (ONS).

10. The method of claim 1, wherein the individual does not consume any food products other than optional water during a time period from the orally administering the composition comprising the MCTs to the individual to the orally administering the meal to the individual.

11. A method of reducing or improving at least one symptom of at least one condition in an individual in need thereof or at risk thereof for which reduced postprandial glucose from a meal is beneficial, wherein the at least one condition is selected from the group consisting of pre-diabetes and diabetes, the method comprising:

orally administering to the individual a composition comprising medium chain triglycerides (MCTs), wherein the composition is administered to the individual in a serving comprising at least about 15.0 g of the MCTs up to about 30.0 g of the MCTs; and subsequently orally administering the meal to the individual after the orally administering the composition comprising the MCTs and within about one hour of the orally administering the composition comprising the MCTs, wherein the meal comprises at least one of a fat or a protein, and the orally administering of the composition and the subsequent orally administering of the meal reduces the postprandial glucose in the individual from the meal.

12. The method of claim 11, wherein the meal is administered between about ten minutes after the orally administering the composition comprising the MCTs and about one hour after orally administering the composition comprising the MCTs.

13. The method of claim 11, wherein the meal is administered between about fifteen minutes after the orally administering the composition comprising the MCTs and about forty minutes after the orally administering the composition comprising the MCTs.

14. The method of claim 11, wherein the meal is administered about thirty minutes after the orally administering the composition comprising the MCTs.

* * * * *